Patented Mar. 6, 1934

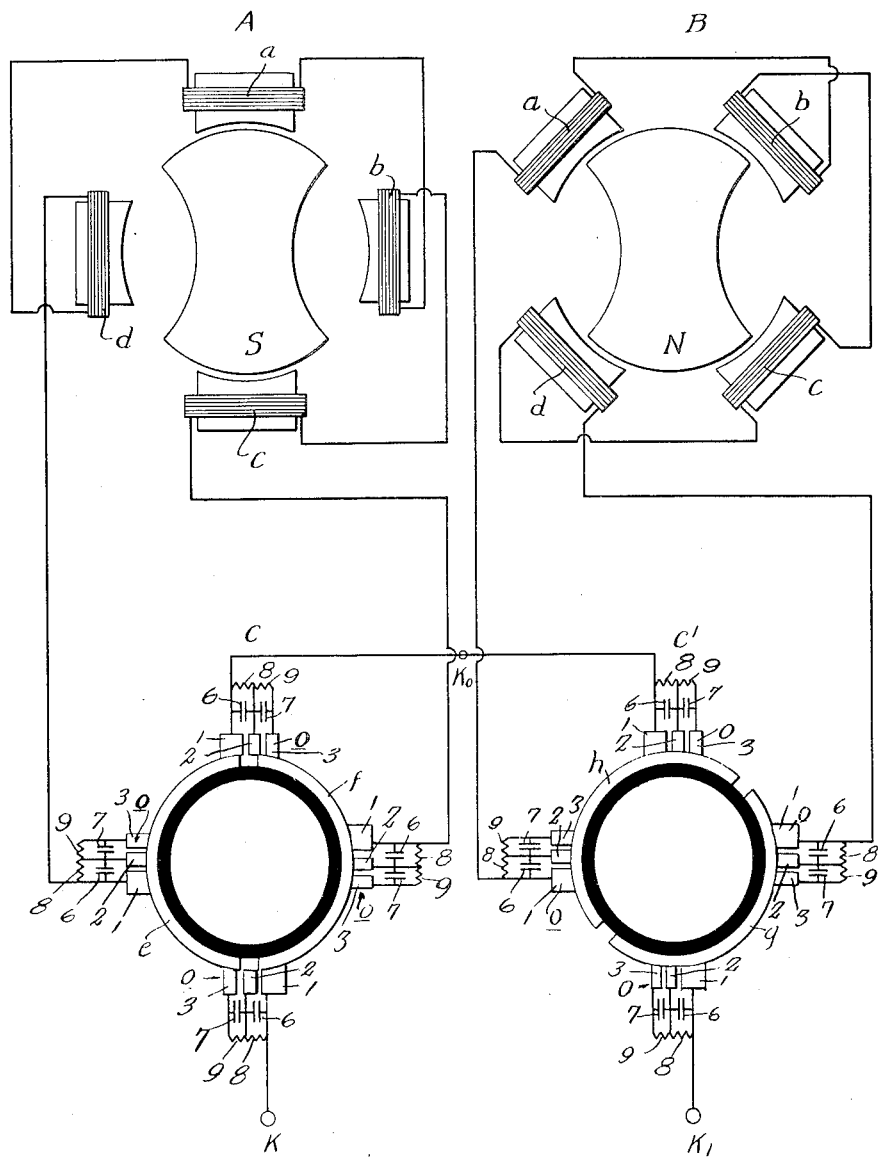

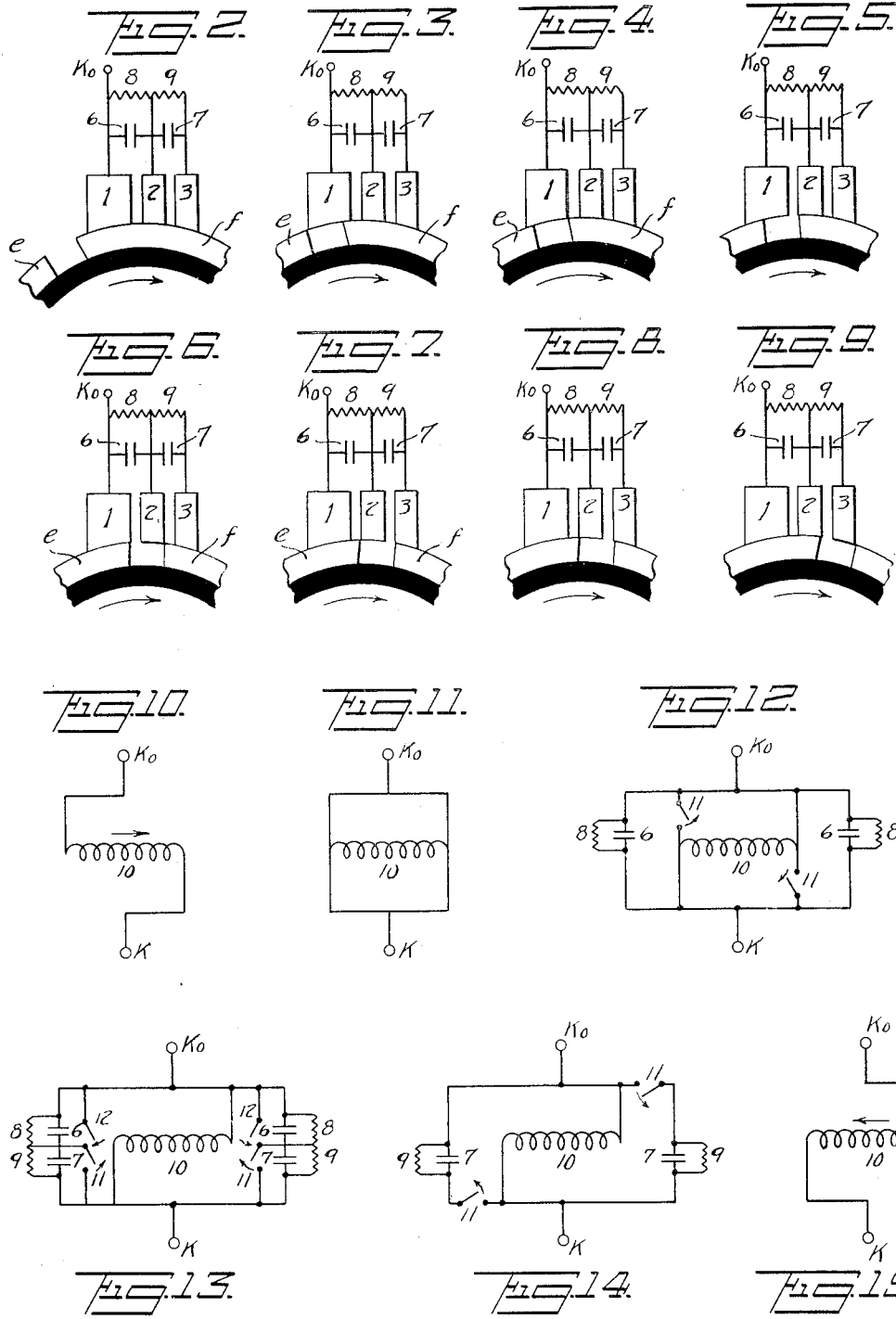

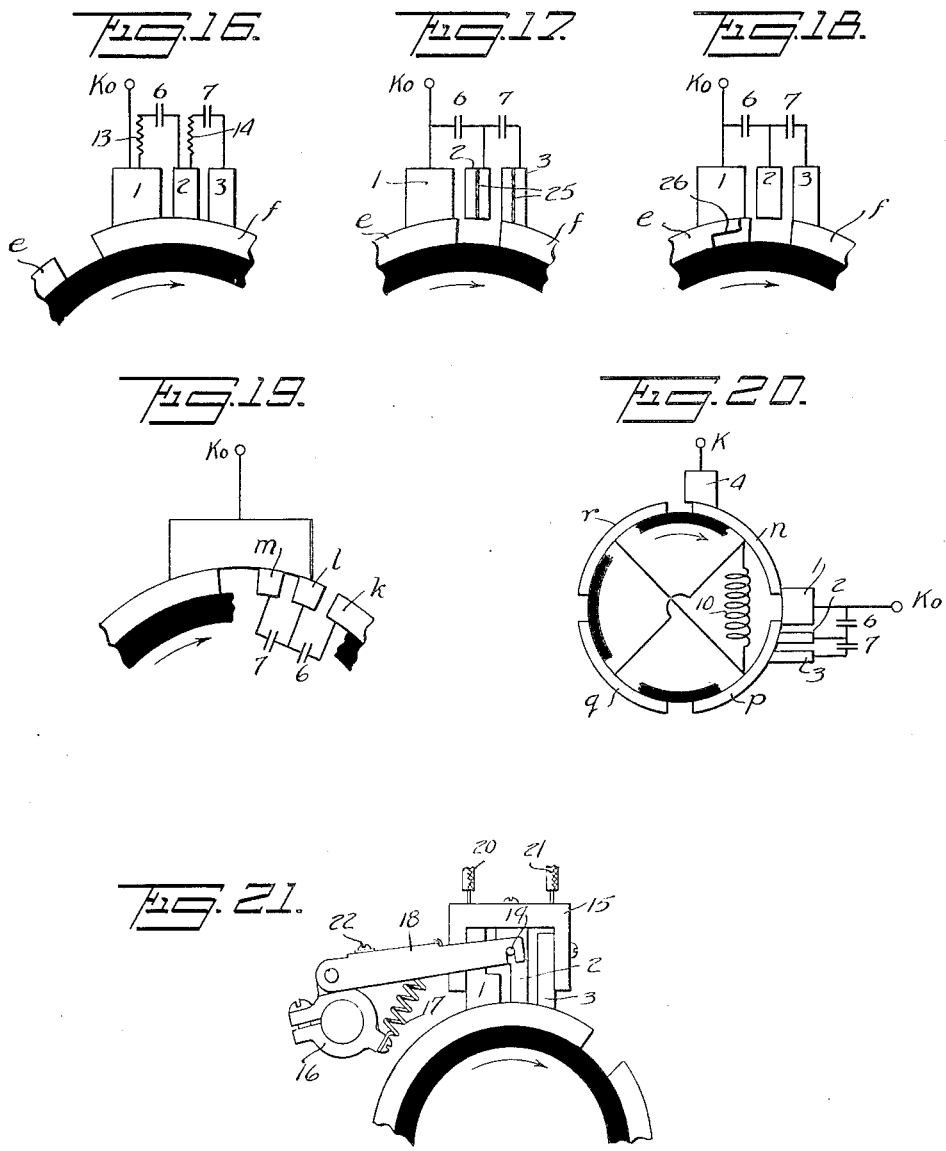

1,949,504

UNITED STATES PATENT OFFICE

1,949,504

ELECTRIC MACHINERY

Baltzar Carl von Platen, Stockholm, Sweden

Application March 18, 1930, Serial No. 436,818. In Sweden March 19, 1929

11 Claims. (Cl. 171—228)

My invention relates to method and means for preventing the formation of arcs on interruption and reversal of inductive electric circuits.

The invention is especially intended to be carried out in direct current machines particularly such of high voltages which are provided with two or more winding systems and in which alternating potentials, phase-displaced relatively to each other, are created, said potentials after having been rectified by means of commutators being united by connecting the winding systems in series, thus forming a unidirectional potential.

My invention is further advantageously applicable to direct current transformers having motor and generator windings in which, when a unidirectional potential of a certain voltage is applied to the motor windings, alternating potentials are created in the generator windings, by the rectification of which a unidirectional potential of another voltage than the voltage applied is obtained.

It will, however, be understood that the invention is not limited to direct current machines of the special type above set forth.

My invention mainly consists therein that the rectification of the alternating potentials created takes place in two or more steps, in which the part of the circuit to be rectified is connected electrically in parallel to condensers, after first being short-circuited. The said circuit can besides be connected to ohmic resistances.

In order to explain the invention, some preferred embodiments thereof will in the following be more fully described as applied to a direct current machine of the kind above mentioned.

In the accompanying drawings Fig. 1 shows a diagram of the connections of the machine. Fig. 2 shows schematically a contact device according to the invention. Figs. 3-9 show different positions of said contact device in relation to a commutator co-operating therewith. Figs. 10-15 show systems of connection for the reversing device and the winding system of the corresponding half of the machine shown in Fig. 1 during such intervals of the commutation which correspond to Figs. 3-9. Figs. 16-20 show further embodiments of arrangements for preventing the formation of arcs at the discharge of the condensers. Fig. 21 shows a constructive embodiment of a holder for the contact brushes.

In the diagram shown in Fig. 1, reference character N designates a rotating "north"-pole and S a rotating "south"-pole which are mechanically connected to each other. The magnetic flux may be created by means of a winding of a kind known per se. The stator of the machine comprises two essentially identical halves which are 45° angularly displaced in relation to each other and are provided with windings $a$, $b$, $c$, $d$ on iron cores. These windings are connected to commutators C and C', each comprising two slip-ring segments $e$, $f$ and $g$, $h$ respectively co-operating with contact members, for instance brushes $o$, four such brushes being provided on each commutator. The poles N and S as well as the slip-rings $e$, $f$, and $g$, $h$ are rotating synchronously, for instance fixed on a common shaft (not shown). The terminals for the generated unidirectional potential are designated by reference characters K and $K_1$. The alternating potentials generated in the stator parts A and B are characterized thereby that they are 90 electrical degrees phase-displaced from each other and that their numerical sum is constant or nearly constant respectively. Each of the potentials will become zero four times during each full revolution of the rotor. Said value (zero) will be maintained during the reversal interval, i. e. when the space between two slip-ring segments of the commutator passes by a contact member.

In one embodiment shown in the drawings the contact device comprises three contact brushes, one main brush 1 being wider than the two auxiliary brushes 2 and 3 said brushes being connected through condensers 6, 7 and ohmic resistances 8, 9 (Fig. 2). The resistances 8 and 9 are provided for preventing oscillations. The slip-ring segments of Fig. 2 correspond to the commutator C for the stator half A in Fig. 1 and are, therefore, designated by reference characters $e$ and $f$ respectively.

In a modified embodiment diagrammatically shown in Fig. 19, the auxiliary brushes 2 and 3 are omitted and instead thereof the slip-ring segment comprises, for instance, three separate parts which are insulated from each other and connected to opposite plates of condensers interconnected between the segment parts.

For making clear the function of the device it is referred to Figs. 1-15, Figs. 3-9 showing different positions of the contact members in relation to the spaces between the slip-ring segments during the reversal, and Figs. 10-15 showing diagrams for the commutator C and the windings of the corresponding half A of the machine during the same interval. In these figures the same reference characters are, therefore, used as in Fig. 2. Thus in Figs. 3-9 the reference characters 1, 2 and 3 designate contact brushes, $e$, $f$ slip-ring segments, 6, 7 condensers and 8, 9 ohmic resistances. In Figs. 10-15 reference character 10 designates the generating windings of the half of the machine corresponding to the commutator C. With $K_0$ is designated the terminal connected to the second commutator C' in Fig. 1, and with K the terminal to be connected to the line. Reference characters 11 and 12 indicate the circuits in which interruption or closing respectively will take place in the position concerned. It is to be remarked that in all the diagrams only such members are shown which in the position concerned are electrically operative. Fig. 10 shows the position before the rectification.

The rectification is initiated by the member 1 engaging the segment e (the slip-rings are supposed to move clockwise in all figures). The winding 10 thus will be short-circuited in accordance with the diagram shown in Fig. 11.

By the brush 1 leaving the segment f the condensers 6 and resistances 8 are connected electrically in parallel to said windings. When the air gap between the brush 1 and the segment f or conduits connected therewith increases, the formation of arcs in this gap is prevented by said condensers and resistances. The gap will increase from zero up to the distance between the brushes 1 and 2 (Fig. 5) whereafter this value will be maintained until the brush 2 is about to leave the segment f. This proceeding is schematically shown in Fig. 12. When the brush 2 leaves the segment f, the condensers 7 and resistances 9 are connected electrically in parallel with the windings 10 and in series with the condensers 6 and resistances 8. When the brush 2 contacts the segment e, the last mentioned condensers and resistances are short-circuited (Figs. 6, 7 and 8). This will be apparent from Fig. 13.

At the moment when the brush 3 leaves the segment f (Fig. 9 and diagram Fig. 14), the reversal is completed and the connection shown in Fig. 15 is obtained. The current through the windings 10 may be designated by reference character i and the direction thereof indicated by the arrow in Fig. 10. In the position shown in Fig. 11 the current will decrease a little due to the ohmic resistance of the windings. In the position shown in Fig. 12 the current in the outer circuit as well as the current i above mentioned tries to pass the condensers. Thus the condensers will be charged and the potential difference created between the condenser plates tries to reduce and reverse the current i. The potential drop in the air gap cannot, however, exceed the potential difference between the condenser plates which difference in turn can increase only with a certain rapidity depending on the electrical constants of the circuits to which the condensers are connected. By suitable adjustment of these constants, i. e. choice of condensers of suitable capacities and suitable ohmic resistances, it is obvious that the formation of arcs can be prevented or reduced and also, at least partly, the rectification of the current i can be effected.

In the position shown in Fig. 13 the action is continued and completed in a corresponding manner and is finished in the position shown in Fig. 14.

For eliminating the formation of arcs on discharging the condensers 6 and 7, when the brush 2 (Fig. 7) or 3 (Fig. 9) respectively approaches the segment e (corresponding to short-circuiting the condenser 6, Fig. 13, or 7, Fig. 14, respectively), ohmic resistances may be connected in series with said condensers as shown at 13 and 14 in Fig. 16.

In this case, however, the current at reversal will pass through the resistances 13, 14 also at the charging of the condensers which is not necessary.

As shown in Fig. 17, this can be eliminated by making the auxiliary brushes 2 and 3 in two parts and interconnecting ohmic resistances 25 therebetween, said resistances consisting for instance of a suitable alloy. The resistances 25 will, of course, not be active at the charging of the condensers but only at their discharging due to the condensers being connected to the part of the auxiliary brushes last leaving the segment f.

A modified embodiment of a such device is shown in Fig. 18 wherein the front part of the segments e and f (taken in the direction of rotation) is divided and an ohmic resistance 26 arranged therebetween, the functioning of said resistance 26 being analogous to that of the resistances 25 in Fig. 17. It is obvious that only the discharge of the condensers 6 and 7 will take place over the resistance 26, but not the charging of the condensers. This arrangement will, however, give the advantage that the contact brushes can be of normal shape and that the number of resistances will be reduced. Thus in the embodiment of the machine shown in Fig. 1 sixteen resistances 25 will be required in the firstmentioned case (Fig. 17) but in the lastmentioned case (Fig. 18) only four such resistances are necessary.

In the modified embodiment shown in Fig. 19 wherein the slip-ring segment is divided in separate parts k, l and m, the function of the device will be analogous to that above described. Of course, the condensers 6 and 7 must not necessarily rotate together with the slip-ring segments but can for instance, in a manner known per se, be connected to brushes bearing on slip-rings which in turn are connected to the parts k, l and m of the slip-ring segment or segments respectively. It will also be evident that resistances can be combined with the condensers in a manner corresponding to that shown for instance in Fig. 2.

Two diametrically arranged contact members o, Fig. 1, may advantageously be a little displaced from their diametrical positions. The rectification of the current in the two halves of the machine can thereby become partly an internal action, so that tensional shocks in the line will be partly avoided. Further, by said displacement the period of time during which the main current passes the condenser can be reduced.

Opposite contact members must not necessarily be of a congruent shape. The number of auxiliary brushes, the distances therebetween and the width of the brushes or their dimensions in general may be varied at will.

In Fig. 20 one embodiment of such asymmetric device of an advantageous character is shown intended to be connected to the one half (A) of the machine shown in Fig. 1. The slip-ring of the commutator (C) may in this case be divided in four segments n, p, q and r, the diametrically positioned segments n, q and r, p respectively being directly connected to each other. The generating winding of the corresponding half of the machine which in known manner, for instance by slip-rings, is connected to the segments n—q and r—p is in the figure represented by reference character 10. The one of the contact members (1, 2, 3) is of a shape similar to that shown in Fig. 2 and the other one consists of a normally shaped brush 4. The contact members are so devised that in the position when the brush 1 connects the segments n and p, the brush 4 has not yet reached the segment r. This will take place on or about the auxiliary brush 2 leaving the segment p.

The action of the device is the following:—

The brush 1 will first short-circuit the segments n and p. The main current is supposed to enter the device at brush 4, pass segment n and leave the device through brush 1. The winding 10 is short-circuited by brush 1. On the segment p leaving brush 1, the current to be commutated will flow through condenser 6 thus charging said condenser. The potential difference obtained between the plates of the condenser aids to reverse the current. When segment p leaves brush 2 the current will either pass the condensers 6 and 7 or, if already reversed, flow through winding 10 to brush 1.

About the same time as segment p leaves brush 2, the segments n and r are connected to each other by the brush 4. The moment of this connection should be so short that the very reversal of the current is not, practically, influenced by said short-circuiting. When the brush 4 has engaged segment r, the main current can reach brush 1 either over winding 10 or over the condensers 6 and 7. When segment p has left brush 3, the reversal is completed and the entire main current will flow through winding 10.

The advantage of this embodiment is that the reversal up to the moment when brush 4 leaves segment n will become an internal action within the circuit formed by winding 10 and the condensers 6 and 7 connected to the brushes 1, 2 and 3 whereby the main current is allowed to pass from brush 4 to brush 1 through segment n.

In Fig. 21 a mechanical embodiment of a holder for the contact brushes 1, 2 and 3 is shown, in which the frontly positioned main brush 1 is wider than the auxiliary brushes 2 and 3 in accordance with what is shown for instance in Figs. 2–9. This means that if the brushes are manufactured from the same material the wear of all brushes will be uniform in that the contact pressure between the main brush and the slip-ring segments will be heavier than is the case for the auxiliary brushes.

The brushes 1, 2 and 3 are fixed by screws to an insulating socket 15 consisting for instance of bakelite, said socket keeping the brushes apart from one another. Two metal arms 18 pivoted on a fixing device 16 of known type are co-operating with pins 19 extending outwardly from the middle brush 2, whereby the arms, due to the action of a spring 17, will press the brushes against the slip-ring segments. By two terminal pieces 20, 21 and a screw 22 on the arms 18 the brushes 1, 3 and 2 respectively may be connected to the wiring of the machine in a manner above described.

It will be noticed that in the commutator device above described it is not necessary to arrange all the contact members in accordance with the invention. The reversing action will, of course, be analogous to that above set forth if only one of the diametrically arranged contact members is provided with three brushes as well as condensers and resistances associated therewith. It will also be understood that the number of brushes instead of three may be either two or more than three and further that the ohmic resistances (8, 9) may be omitted.

Having thus described my invention what I claim is:

1. A method of preventing the formation of arcs on interruption and reversal of inductive electric circuits which comprises effecting the reversal in a plurality of steps involving first short circuiting the part of the circuit to be reversed, then inserting a condenser in circuit therewith whereby said condenser is charged, then breaking the circuit through said condenser and discharging said condenser through a resistance and short circuiting said resistance during at least a part of the time the condenser is being charged.

2. A method of preventing the formation of arcs on interruption and reversal of inductive electric circuits which comprises effecting the reversal in a plurality of steps involving first short circuiting the part of the circuit to be reversed, then progressively inserting a plurality of condensers in said circuit whereby said condensers become charged, then breaking the circuit through said condensers and progressively discharging the same through a resistance and short circuiting said resistance during at least a part of the time said condensers are being charged.

3. In a device of the class described having a winding and commutator connected thereto, means for preventing arcs on interruption and reversal of said winding comprising a main brush adapted to span successive segments of said commutator and an auxiliary brush following said main brush and connected thereto through a condenser, whereby reversal is effected by first short circuiting said winding and then inserting said condenser in circuit therewith and finally breaking the circuit through said condenser, a resistance, means connecting said resistance in series with said condenser while said condenser is being discharged and means short circuiting said resistance during at least a part of the time said condenser is charging.

4. In a device of the class described having a winding and commutator connected thereto, means for preventing arcs on interruption and reversal of said winding comprising a main brush adapted to span successive segments of said commutator and a plurality of auxiliary brushes following said main brush and interconnected through condensers, said auxiliary brushes being positioned to successively pass a given segment whereby reversal is effected by first short circuiting the part of the circuit to be reversed and then progressively inserting said condensers in said circuit and finally breaking the circuit through said condensers, resistances connected in series with said condensers and means short circuiting said resistances during at least a part of the time while said condensers are being charged.

5. In a device of the class described having a winding and commutator connected thereto, means for preventing arcs on interruption and reversal of said winding comprising a main brush adapted to span successive segments of said commutator and an auxiliary brush following said main brush, said auxiliary brush being formed in two parts with a resistance connected therebetween and a condenser connected between said main brush and the trailing part of said auxiliary brush whereby said condenser is discharged through said resistance but said resistance is short circuited by said commutator while said condenser is being charged.

6. In a device of the class described having windings and a commutator connected thereto, means for preventing the formation of arcs upon reversal of said windings comprising pairs of sets of brushes, each set consisting of a main brush and an auxiliary brush interconnected by a reactance, the sets of brushes of each pair being angularly offset with respect to the angular displacement of the corresponding commutator segments whereby the connections to the sets of each pair are successively changed in order to reduce tensional shocks during reversal.

7. In a device of the class described having a winding and a commutator connected thereto, commutating means comprising a main brush and a pair of auxiliary brushes progressively displaced with respect to the direction of relative movement of said commutator, a condenser interconnecting the main brush and the trailing auxiliary brush and a resistance interconnecting said auxiliary brushes.

8. In a device of the class described having a winding and commutator connected thereto, means for preventing arcs on interruption and reversal of said winding comprising a main brush adapted to span successive segments of said commutator and an auxiliary brush following said main brush, said auxiliary brush being formed in two parts, a resistance interposed between said parts and forming, with said parts, a unitary structure and a condenser interconnecting one of said parts with said main brush.

9. In a device of the class described having a winding and commutator connected thereto, means for preventing arcs on interruption and reversal of said winding comprising a main brush adapted to span successive segments of said commutator and an auxiliary brush following said main brush, said auxiliary brush being formed in two parts adapted to successively make contact with the segments of said commutator, a resistance mechanically and electrically interposed between said parts and a condenser interconnecting said main brush and the trailing part of said auxiliary brush.

10. In a device of the class described having a winding and commutator connected thereto, means for preventing arcs on interruption and reversal of said winding comprising a main brush adapted to span successive segments of said commutator and an auxiliary brush following said main brush, said auxiliary brush being formed in two parts separated by a resistance and forming a unitary structure, and a condenser connecting the trailing part to said main brush whereby said resistance is interposed in circuit with said condenser during discharge and is short circuited during the charging thereof.

11. In a device of the class described having a winding and commutator connected thereto, means for preventing arcs on interruption and reversal of said winding comprising a main brush adapted to span successive segments of said commutator and an auxiliary brush following said main brush, a condenser interconnecting said main brush and said auxiliary brush, said commutator having auxiliary segments leading each commutating segment and separated therefrom by a resistance material whereby to discharge said condenser during commutation through said resistance.

BALTZAR CARL von PLATEN.